(12) United States Patent
Takada et al.

(10) Patent No.: US 7,234,350 B2
(45) Date of Patent: Jun. 26, 2007

(54) UNBALANCE MEASURING APPARATUS

(75) Inventors: Satoshi Takada, Hekinan (JP); Rikizou Akagi, Chita-gun (JP); Hideyuki Sumino, Hekinan (JP); Shingo Inaishi, Gamagoori (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 11/116,041

(22) Filed: Apr. 27, 2005

(65) Prior Publication Data

US 2005/0247130 A1 Nov. 10, 2005

(30) Foreign Application Priority Data

May 7, 2004 (JP) .............................. 2004-138548

(51) Int. Cl.
*G01M 1/00* (2006.01)
(52) U.S. Cl. ............................................. 73/473; 73/66
(58) Field of Classification Search .................. 73/473
See application file for complete search history.

(56) References Cited

U.S. PATENT DOCUMENTS

| | | | | |
|---|---|---|---|---|
| 3,911,751 A | * | 10/1975 | Shooter et al. ............... | 73/464 |
| 4,445,373 A | * | 5/1984 | Mueller ........................ | 73/473 |
| 4,543,825 A | * | 10/1985 | Schonfeld et al. ............ | 73/459 |
| 4,671,676 A | * | 6/1987 | Chen et al. ................... | 384/100 |
| 4,726,690 A | * | 2/1988 | Thelen .......................... | 384/99 |
| 4,976,147 A | * | 12/1990 | Okochi et al. ................ | 73/455 |
| 5,255,566 A | * | 10/1993 | Okumura ...................... | 73/660 |
| 5,939,629 A | * | 8/1999 | Abboud ........................ | 73/480 |
| 2006/0144141 A1 | * | 7/2006 | Thelen .......................... | 73/471 |
| 2006/0266115 A1 | * | 11/2006 | Feldmann et al. ............ | 73/462 |

FOREIGN PATENT DOCUMENTS

JP 3438333 6/2003

* cited by examiner

*Primary Examiner*—Hezron Williams
*Assistant Examiner*—Samir M. Shah
(74) *Attorney, Agent, or Firm*—Harness, Dickey & Pierce, PLC

(57) ABSTRACT

A bearing 41 of a support portion 4 for rotatably supporting a shaft 11 of a rotating body 10 to be measured with respect to the magnitude of unbalance thereof is formed into a hollow U-shape and has formed therein an injection port 41b for injecting a gas towards the shaft. As the shaft can be supported and floats without making contact with the bearing by virtue of the gas injected from the injection port, the friction can be made small and, hence, a change in rotational speed can be made small. The number and position of the injection ports are determined as required.

7 Claims, 4 Drawing Sheets

UNBALANCE MEASURING APPARATUS

BACKGROUND OF THE INVENTION

1. Field of the Invention

The present invention relates to an unbalance measuring apparatus for measuring the magnitude of an unbalance of a small rotating body 10.

2. Description of the Related Art

In a conventional roller-drive type unbalance measuring apparatus, as shown in FIG. 5, bearings for rotatably supporting a shaft 11 of a rotating body 10 are constituted by two rollers 12a, 12b which are supported on a support portion 4 via ball bearings. Due to this, in measuring the magnitude of unbalance of the rotating body 10, which is large in size and heavy in weight, by applying a rotational force to the rotating body before a measurement and allowing the rotating body to continue to rotate by virtue of inertial force while measuring the magnitude of unbalance of the rotating body, even with the bearings constituted by the rollers 12a, 12b, the change in rotational speed of the rotating body remains small during the measurement, and the unbalance measurement can be implemented with high accuracy (refer to Japanese Patent Publication No. 3438333).

In the conventional roller-drive type unbalance measuring apparatus which uses the rollers for the bearings for supporting the shaft of the rotating body, however, with a small and light rotational body, the frictional force which acts between the rollers and the rotating body becomes larger than the inertial force, whereby the rotational speed of the rotating body, which is under measurement, decreases drastically, leading to a problem that the magnitude of unbalance of the rotating body cannot be measured.

SUMMARY OF THE INVENTION

The invention was made in the light of the situations, and an object thereof is to provide an unbalance measuring apparatus which can provide a small change in rotational speed of even a small and light rotating body so as to measure the magnitude of unbalance thereof with high accuracy.

In an unbalance measuring apparatus according to the invention, a bearing for rotatably supporting a shaft of a rotating body, which is measured with respect to the magnitude of unbalance thereof, is such as to be made to have an injection port for injecting a gas towards the shaft of the rotating body, whereby the shaft of the rotating body, when rotating, is allowed to float stably without making contact with the bearing. Thus, as the shaft of the rotating body does not make contact with the bearing, the frictional drag is small, and hence the change in rotational speed can be made small. In addition, the placement and removal of the rotating body to and from the bearings can be facilitated, thereby making it possible to facilitate the automation and speed-up of the measuring process by forming the bearing into, for example, a U-shape or a V-shape.

In the unbalance measuring apparatus according to the invention, the bearing is formed into the U-shape or V-shape, and injection ports are provided in the bearing so formed in such a manner as to inject a gas horizontally, or obliquely upwards or downwards from both sides of the bearing towards the center C of the shaft of the rotating body, whereby the rotating body is stabilized at the center of the U-shape or V-shape so as to be allowed to float stably by virtue of the gas caused to swirl therearound by the rotation thereof. Consequently, a highly accurate unbalance measurement can be attained.

In the unbalance measuring apparatus according to the invention, the bearing is formed into the U-shape or V-shape, and injection ports are provided in the bearing so formed in such a manner as to inject a gas horizontally from both the sides of the bearing towards a position slightly upwards of, or positions slightly upwards and slightly downwards of the center C of the shaft of the rotating body. In this case, too, a similar function and advantage to those just mentioned above can be provided.

In the unbalance measuring apparatus according to the invention, the bearing is formed into the U-shape or V-shape, and injection ports are provided in the bearing so formed in such a manner as to inject a gas horizontally and vertically upwards from both the sides of the bearing towards the center C of the shaft of the rotating body, and in this case, too, a similar function and advantage to those mentioned above can be provided.

In the unbalance measuring apparatus according to the invention, the bearing is made to be wider as it extends upwards, whereby the placement and removal of the rotating body to and from the bearings can be further facilitated, and contact between the bearing and the rotating body during the placement or removal work can be prevented, thereby making it possible to prevent the damage to both the bearing and the rotating body. In addition, when placing the rotating body, to which a rotational force is applied, on to the bearing, the reduction in rotational speed can be prevented which would otherwise result from the contact of the rotating body with the bearing.

The present invention may be more fully understood from the description of preferred embodiments of the invention, as set forth below, together with the accompanying drawings.

DESCRIPTION OF THE PREFERRED EMBODIMENTS

Figure 1:
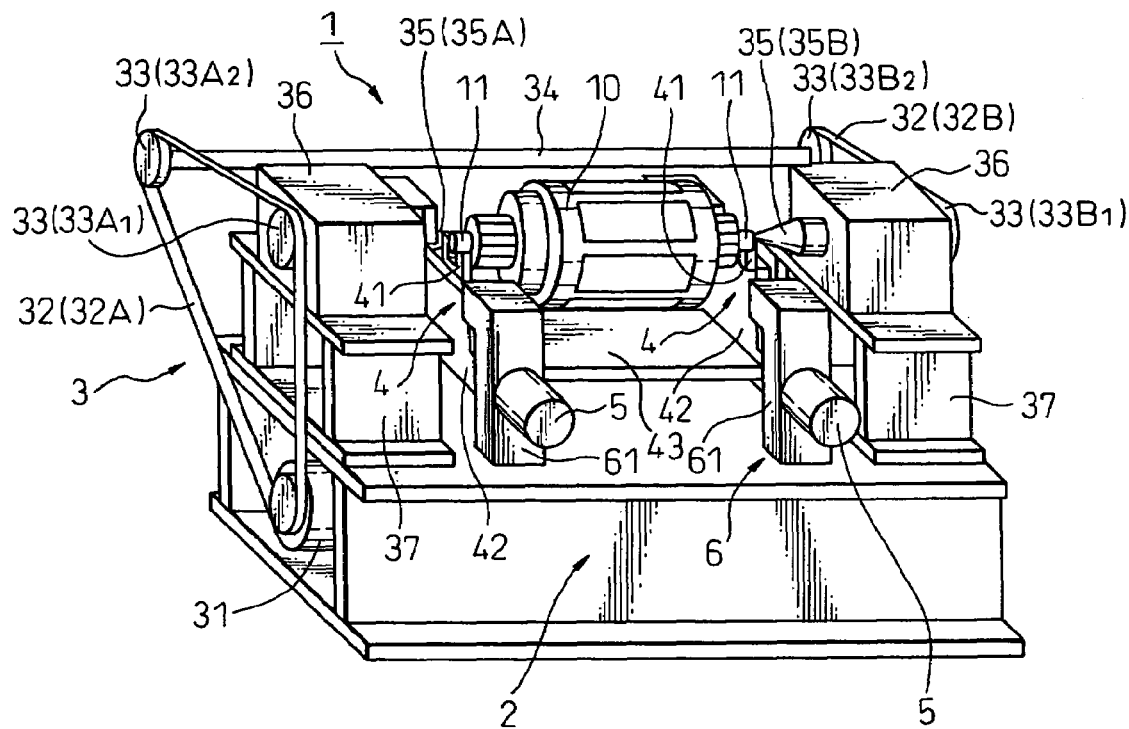
FIG. 1 is a perspective view illustrating the overall construction of an unbalance measuring apparatus according a mode for carrying out the invention.

Hereinafter, an unbalance measuring apparatus according to a mode for carrying out the invention will be described based on the accompanying drawings. FIG. 1 is a perspective view illustrating the overall construction of the unbalance measuring apparatus according to the mode for carrying out the invention. In general, the unbalance measuring apparatus 1 includes a measuring apparatus main body 2 which constitutes a base therefor, a drive portion 3 for rotating a rotating body 10 which constitutes an object to be measured, support portions 4 for rotatably supporting the rotating body 10, measuring portions 5 for measuring vibrations of the support portions 4, holding portion 6 for holding the support portions 4 to the measuring apparatus main body 2 while allowing the support portions 4 to vibrate and the like.

The drive portion 3 includes a drive motor 31, which is a rotational drive implement for generating a drive force, belts 32, pulleys 33 and a connecting shaft 34, which constitute a transmission implement for transmitting the rotation of the drive motor 31, rotational body clamping shafts 35, which are adapted to be connected and disconnected as required, and the like. The shaft 35 is held in a shaft holder 36 via a bearing in such a manner as not only to rotate but also to slide to and fro, and the shaft holder 36 is fixed to the measuring apparatus main body 2 by means of a shift support table.

The drive motor 31, which is the rotational drive implement, is fixed to the measuring apparatus main body 2, and the rotation of the drive motor 31 is transmitted via the belt 32A, which is one of the belts 32, to the pulley $33A_1$ fixed to the shaft 35A, which is one of the shafts 35 of the drive portion, and the pulley $33A_2$ fixed to one end of the connecting shaft 34. Furthermore, the rotation is transmitted from the pulley $33B_2$ fixed to the other end portion of the connecting shaft 34 to the pulley $33B_1$ fixed to the shaft 35B, which is the other of the shafts 35 of the drive portion, via the other belt 32B. Thus, the shafts 35A and 35B rotate in the same direction by virtue of the rotation of the drive motor 31. Consequently, the rotating body 10 can be rotated by the drive motor 31 in such a state that the shafts 35A, 35B are advanced so as to hold to clamp a shaft 11 of the rotating body 10 from both sides thereof.

Figure 2:
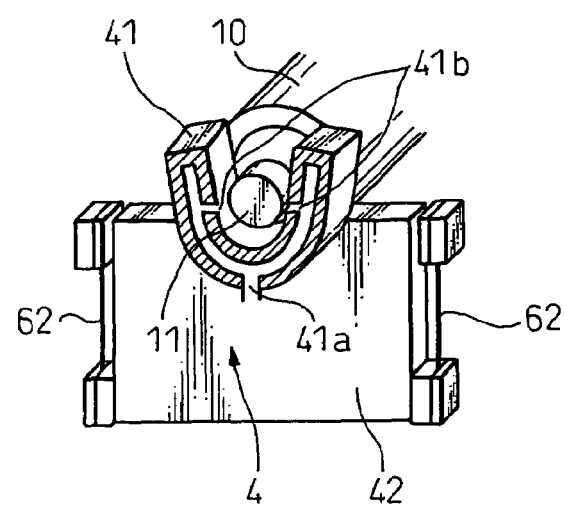
FIG. 2 is a partially sectional perspective view of a support portion of the unbalance measuring apparatus according to the mode for carrying out the invention.

The support portion 4 for rotatably supporting the rotating body 10, which constitutes a feature of the mode for carrying out the invention, includes, as shown in an enlarged fashion in FIG. 2, a bearing 41 for supporting the shaft 11 of the rotating body 10 and a bearing plate 42 for holding the bearing 41. FIG. 2 illustrates a sectional view of the bearing 41. This support portion 4 is provided as a pair with a view to supporting the shaft 11 of the rotating body 10 at both ends thereof. Thus, two support portions 4 are provided on the unbalance measuring apparatus. The two support portions 4 are positioned so as to be spaced apart from each other with respect to an axial direction of the shaft 11 and hence rotatably support the shaft 11 at one end and the other end thereof.

The bearing 41 is formed into a hollow U-shape, and an inlet port 41a is bored in an external wall surface of the bearing 41 so formed for introducing a gas therethrough into the interior of the hollow space of the bearing 41, while a plurality of injection ports 41b are bored in an internal wall surface of the bearing 41 for injecting a gas so introduced into the hollow space towards the shaft 11 of the rotating body 10, whereby a gas is injected from the injection ports 41b relative to the shaft 11 so that the shaft 11 is caused to float above the bearing 41 for fluid support at the time of measuring the magnitude of unbalance of the rotating body 10.

The bearing 41 provided on the support portion 4 is formed into the U-shape. The bearing 41 has a bottom portion situated underneath the shaft 11 and side portions which rise upwards from both sides of the bottom portion, respectively. The side portions are made to have a sufficient height for accommodating the shaft 11 in the U-shape bearing 41. The bearing 41 provided on the support portion 4 constitutes a U-shape channel which receives the shaft 11 therein. The U-shape channel in the bearing 41 is defined by a bottom situated underneath the shaft 11 and sides situated on both left- and right-hand sides of the shaft 11. The bottom and sides are formed continuously so that a smooth U-shape can be exhibited. The sides of the U-shape channel are made to be high enough that the shaft 11, which is to be accommodated therein, is held between the sides, or to such an extent, for example, that the shaft 11 is not allowed to protrude upwards from the sides. The U-shape channel is larger than the shaft 11. The plurality of injection ports 41b are opened in the bottom and sides of the U-shape channel. The plurality of injection ports 41a are made to open towards the shaft 11. The plurality of injection ports 41b extends in the bottom and sides of the U-shape channel in such a manner as to be directed towards the shaft 11. The plurality of injection ports 41b are arranged in a symmetrical fashion in a longitudinal direction along the axis of the shaft 11. A passageway is formed in the interior of the bearing 41 for supplying a gas for the plurality of the injection ports 41b. The gas passageway can be arranged in a symmetrical fashion so as to distribute a gas evenly to the plurality of injection ports 41b. The gas passageway is connected to a gas supply unit such as a pump for supplying a gas. The gas passageway is connected to such a gas supply unit by means of a hose, for example, in order not to restrict the vibration of the support portions 4.

Figure 3:
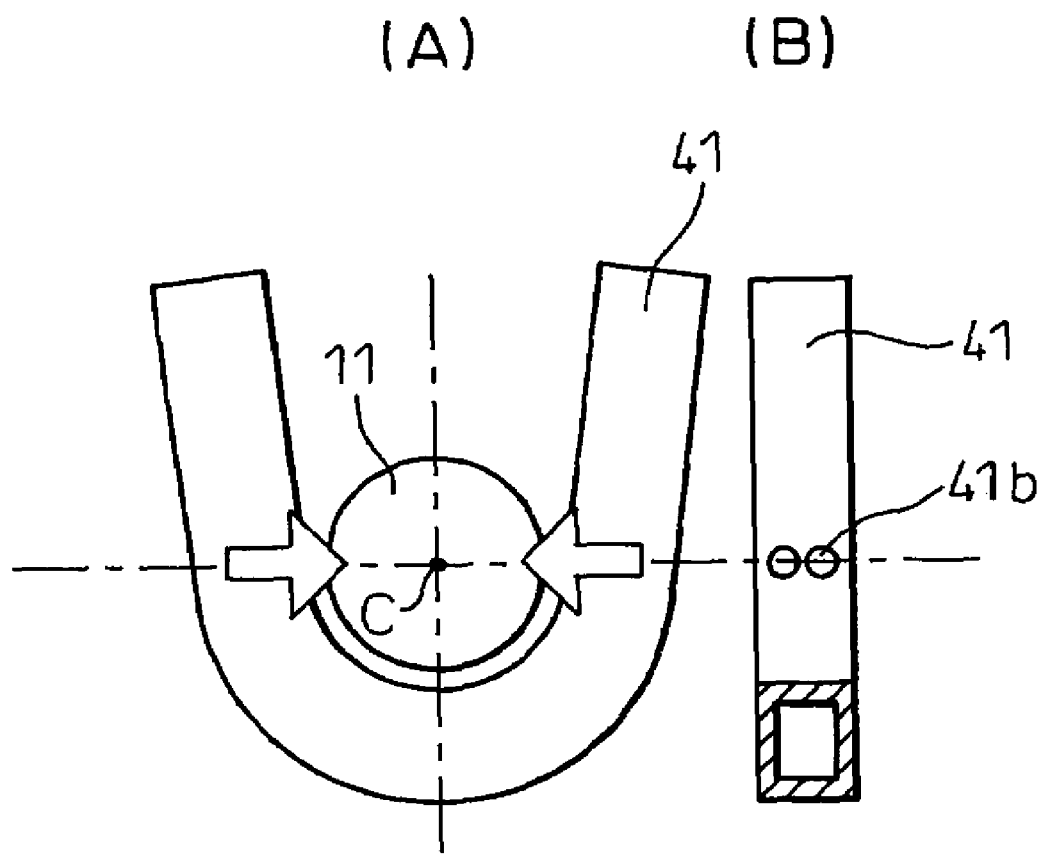
FIG. 3 shows a plan view (A) and a vertical sectional view (B) of a bearing according to the mode for carrying out the invention in which gas injection ports according to a first embodiment of the invention are formed.

In a first embodiment shown in FIG. 3, injection parts 41b are formed so that a gas is injected horizontally from both sides towards the center C of the shaft 11 of the rotating body 10 which is placed within the U-shape bearing 41. The injection ports 41b are provided such that two injection ports are arranged in parallel in a longitudinal direction on each side of the U-shape bearing 41. Thus, by injecting gas horizontally from both the sides of the bearing 41 towards the center C of the shaft, the rotating body 10, which is rotating, is stabilized at the center of the U-shape to thereby float stably due to the gas that is caused to swirl by virtue of the rotation of the rotating body 10.

The bearing 41 is disposed in such a manner as to protrude from an upper side of a bearing plate 42, which is formed into something like a rectangular plate. The support portion 4 is held by means of the holding portion 6 in such a manner as to be allowed to vibrate. The support portion 4 is supported elastically by the holding portion 6 such that the support portion 4 itself can vibrate. The support portion 4 is held by the holding portion 6 in such a manner as to be suspended.

The holding portion 6 has a holding table 61 provided erectly on the measuring apparatus main body 2 and a rod spring 62 which is suspended from an upper portion of the holding table 61 and is connected to a lower portion of the bearing plate 42 at a lower end thereof. An upper end of the rod spring 62 is fixed to a fixing portion which extends from the upper portion of the holding table 61. The lower end of the rod spring 62 is fixed to a fixing portion which extends sideways from a lower portion on a side of the bearing plate 42. The holding portion 6 is arranged in a pair in such a manner as to face, respectively, left- and right-hand sides of the shaft 11. A pair of holding portions 6 holds one support portion 4 in such a manner as to be allowed to vibrate. In this embodiment, four holding portions 6 are provided to support two support portions 4 in such a manner as to be allowed to vibrate. Thus, the unbalanced rotation of the rotating body 10 causes the support portions 4 to vibrate.

Note that, as a gap between the U-shape bearing 41 and the shaft 11 of the rotating body 10 is inconsiderable, in the event that the relative position between the bearing plates 42 positioned at both the ends of the rotating shaft 11 changes even slightly, the shaft 11 of the rotating body 10 is brought into contact with the bearings 41 to thereby reduce the rotational speed of the shaft 11, and to avoid this, the bearing plates 42 positioned at the ends of the shaft 11 so as to be apart from each other in the axial direction of the shaft 11 are fixed by means of a connecting portion 43 such that the relative position thereof does not deviate. The connecting portion 43 extends along the shaft 11, and one end of the connecting portion 43 is connected to one of the bearing plates 42, whereas the other end thereof is connected to the other bearing plate 42.

The measuring portion 5 is mounted on the holding table 61, and a stylus (not shown) of the measuring portion (a sensor) 5 is connected to each support portion 4. Thus, the vibration of the support portion 4 in accordance with the magnitude of unbalance of the rotating body 10 is measured by the measuring portion 5 via the stylus and is then converted into an electric signal to be sent to a sensor signal processor (not shown).

Next, the operation of the unbalance measuring apparatus of the invention, which is constructed as has been described heretofore, will be described. Firstly, a gas (here, air) is injected in advance from the injection ports 41b in the bearings 41, so that the shaft 11 of the rotating body 10 is allowed to float within the bearings 41. In this state, the end portions of the shaft 11 of the rotating body 10, which is an object to be measured, are placed into the bearings 41, which are the support portions 4, so that the shaft 11 is allowed to float within the bearings 41.

Next, the shafts 35A, 35B are advanced, so that the shaft 11 of the rotating body 10 is held from both the ends thereof by the shafts 35A, 35B so advanced, whereby the shaft 11 of the rotating body 10 is clamp supported. Next, the drive motor 31 is activated so as to rotate the rotating body 10 until a predetermined rotational speed (for example, 2500 rpm) is reached.

When the predetermined rotational speed is attained, the shafts 35A, 35B of the drive portion 3 are withdrawn so as to release the clamping of the shaft 11 of the rotating body 10. Namely, the drive portion 3 is separated from the rotating body 10. The rotating body 10 keeps rotating by virtue of inertia.

Next, in a state in which the rotating body 10 is rotating by virtue of inertia, vibrational amplitudes at the support portions 4 are measured by the measuring portions 5, and the magnitude and angle of unbalance of the rotating body 10 are obtained by the sensor signal processor, not shown. Namely, when the rotating body 10 is unbalanced, vibrational amplitudes in accordance with the magnitude of unbalance of the rotating body 10 are generated in the support portions 4 (the bearings 41) which support the shaft 11 of the rotating body 10 by virtue of the rotation of the rotating body 10, and the vibrational amplitudes so generated are then measured via the measuring portions 5.

Next, the shafts 35A, 35B are advanced so as to clamp the shaft 11 of the rotating body 10 to connect the drive portion 3 to the rotating body 10, and the rotation of the rotating body 10 is stopped in such a state that the position of unbalance comes to a predetermined position (here, a top). Next, a weight corresponding to the magnitude of unbalance is removed from (or added to) the rotating body 10.

Thus, the magnitude of unbalance of the rotating body 10 is measured to rectify the unbalance thereof.

FIGS. 4A to 4E show, respectively, second to sixth different embodiments of bearings according to the mode for carrying out the invention, in each of which (A) designates a plan view a bearing, whereas (B) designates a vertical sectional view thereof. In a second embodiment shown in FIG. 4A, injection ports 41b are formed in a U-shape bearing 41 such that a gas is injected obliquely upwards from both sides of the bearing 41 towards the center C of the shaft 11 of the rotating body 10. In addition, as to the number of the injection ports 41 formed in the bearing 41, two injection ports are formed on each side of the bearing 41 in such a manner as to be arranged in parallel in a longitudinal direction along the axial direction of the shaft 11, and therefore, in total, four injection ports 41b are provided.

Figure 4:
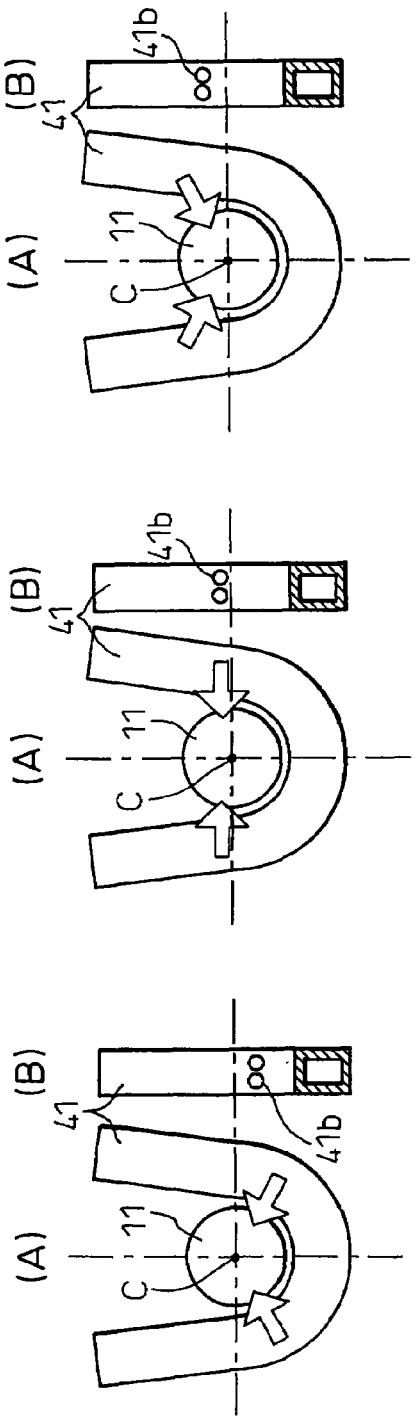
FIGS. 4A to 4E are explanatory views of gas injection ports according to second to sixth embodiments of the invention which are formed in the bearing according to the mode for carrying out the invention, respectively, in each of which (A) designates a plan view of the bearing and (B) designates a vertical sectional view thereof.
Figure 5:
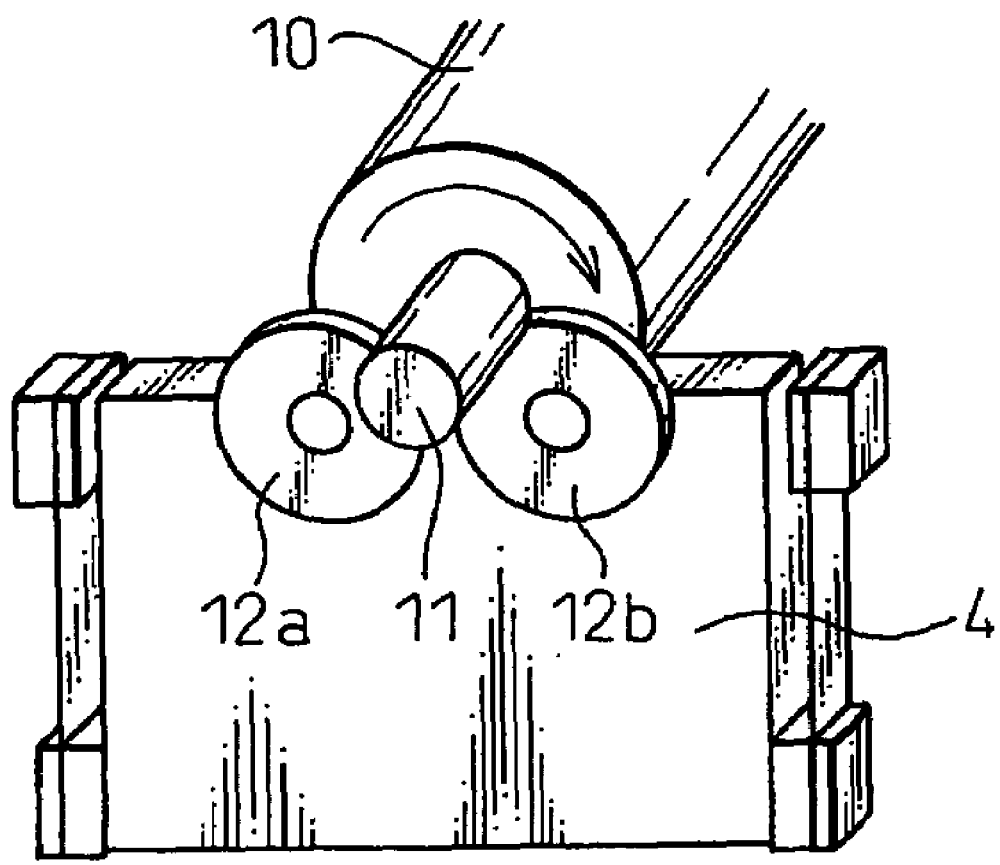
FIG. 5 is a partially enlarged view of a support portion of a conventional unbalance measuring apparatus.

In a third embodiment shown in FIG. 4B, injection ports 41b are formed in a U-shape bearing 41 such that a gas is injected horizontally from both sides of the bearing 41 towards a position slightly upwards of the center C of the shaft 11. In this case, too, as to the number of the injection ports 41b formed in the bearing 41, two injection ports are formed on each side in such a manner as to be arranged in parallel in the longitudinal direction (the axial direction of the shaft 11), and therefore, in total, four injection ports 41b are provided.

In a fourth embodiment shown in FIG. 4C, injection ports 41b are formed in a U-shape bearing 41 such that a gas is injected obliquely downwards from both sides of the bearing 41 towards the center C of the shaft 11. In addition, as to the number of the injection ports 41b formed in the bearing 41, two injection ports are formed on each side in such a manner as to be arranged in parallel in the longitudinal direction along the rotational shaft 11, and therefore, in total, four injection ports 41b are provided.

In a fifth embodiment shown in FIG. 4D, injection ports 41b are formed in a U-shape bearing 41 such that a gas is injected horizontally from both sides of the bearing 41 towards positions slightly upwards and slightly downwards of the center C of the shaft 11. In this case, as to the number of the injection ports 41b formed in the bearing 41, two injection ports 41b for injecting the gas horizontally towards the position slightly upwards of the center C are formed on each side in such a manner as to be arranged in parallel in the longitudinal direction along the rotational shaft 11, and an injection port 41b for injecting the gas horizontally towards the position slightly downwards of the center C is formed on each side. Thus, in total, six injection ports 41b are provided.

In a sixth embodiment shown in FIG. 4E, there are provided injection ports 41b which are formed in a U-shape bearing 41 such that a gas is injected not only horizontally from both sides of the bearing 41 towards the center C of the shaft 11 but also vertically upwards towards the center C of the shaft 11. In this case, as to the number of the injection ports 41b formed in the bearing 41, two injection ports 41b for injecting the gas horizontally are formed on each side in such a manner as to be arranged in parallel in the longitudinal direction along the rotational shaft 11, and one or two injection ports 41b for injecting the gas vertically upwards are formed.

The injection ports 41 according to the second to sixth embodiments that have been described above are each such as to provide basically a similar function and advantage to those of the first embodiment. In particular, in the sixth embodiment, by providing the injection port 41 in a lower side of the bearing 41 so as to inject the gas vertically upwards, the floating force of the rotating body 10 can be increased largely.

In addition, while, in the respective embodiments described heretofore, the two injection ports 41a are provided in parallel along the axial direction of the rotational shaft, only a single injection port may be provided instead, or three injection ports may be provided as with the fifth embodiment. In addition, the number of injection ports may be changed as required. Furthermore, while, in the respective embodiments described heretofore, the injection ports are made transversely symmetrical in position and arrangement, they may be made asymmetrical.

Note that, in the respective embodiments described heretofore, the U-shape is adopted as the shape of the bearing 41, the shape of the bearing 41 is not limited to the U-shape, but, for example, a V-shape or any other shape may be adopted.

As has been described heretofore, according to the mode for carrying out the invention, as the rotating body is not brought into contact with the bearings, the friction drag is small, and hence the change in rotational speed can be made small. Therefore, the invention is preferable for unbalance measurement of a small and light rotational body. In addition, by forming the bearings into the U-rotary or V-shape, the placement and removal of the rotating body to and from the bearings can be facilitated, thereby making it possible to facilitate the automation and speed-up of the measuring process.

While the invention has been described by reference to the specific embodiment chosen for purposes of illustration, it should be apparent that numerous modifications could be made thereto by those skilled in the art without departing from the basic concept and scope of the invention.

The invention claimed is:

1. An unbalance measuring apparatus comprising:
   a measuring apparatus main body which constitutes a base for the unbalance measuring apparatus;
   a drive portion for driving a rotating body to be measured with respect to the magnitude of unbalance;
   a support portion for rotatably supporting the rotating body;
   a measuring portion for measuring vibrations of the support portion;
   a holding portion for holding the support portion to the measuring apparatus main body in such a manner as to be allowed to vibrate;
   a bearing for rotatably supporting the rotating body, the bearing having an injection port for injecting a gas towards a shaft of the rotating body; and
   means for mounting the bearing on the support portion such that the vibrations of the rotating body are transmitted to the support portion.

2. An unbalance measuring apparatus as set forth in claim 1, wherein the bearing is formed into a U-shape or a V-shape and has injection ports for injecting a gas horizontally or obliquely upwards or downwards from both sides thereof towards the center of the shaft of the rotating body.

3. An unbalance measuring apparatus as set forth in claim 1, wherein the bearing is formed into a U-shape or a V-shape and has injection ports for injecting a gas horizontally from both sides thereof towards positions slightly upwards and slightly downwards of the center of the shaft of the rotating body.

4. An unbalance measuring apparatus as set forth in claim 1, wherein the bearing is formed into a U-shape or V-shape and has injection ports for injecting a gas horizontally from both sides thereof and for injecting the gas vertically upwards towards the center of the shaft of the rotating body.

5. An unbalance measuring apparatus as set forth in claim 1, wherein the bearing is made to be wider as it extends upwards.

6. An unbalance measuring apparatus as set forth in claim 1, wherein a gap is formed between the shaft of the rotating body and the bearing by virtue of the gas injected from the injection port in the bearing.

7. An unbalance measuring apparatus as set forth in claim 1, wherein the bearing is formed into a U-shape or a V-shape having two legs, at least one of the two legs extending to a position above the shaft of the rotating body when the rotating body is supported by the bearing.

* * * * *